United States Patent
Cho

(10) Patent No.: US 7,241,529 B2
(45) Date of Patent: Jul. 10, 2007

(54) SECONDARY BATTERY INCLUDING IMPROVED CAP ASSEMBLY AND PLUG FOR THE SECONDARY BATTERY

(75) Inventor: Sung-Jae Cho, Cheonan (KR)

(73) Assignee: Samsung SDI Co., Ltd., Suwon-si (KR)

( * ) Notice: Subject to any disclaimer, the term of this patent is extended or adjusted under 35 U.S.C. 154(b) by 463 days.

(21) Appl. No.: 10/658,755

(22) Filed: Sep. 10, 2003

(65) Prior Publication Data

US 2004/0115521 A1 Jun. 17, 2004

(30) Foreign Application Priority Data

Sep. 11, 2002 (KR) .................... 10-2002-0054942

(51) Int. Cl.
  $H01M$ 2/36 (2006.01)
  $H01M$ 2/08 (2006.01)
  $H01M$ 4/02 (2006.01)
  $H01M$ 2/02 (2006.01)

(52) U.S. Cl. .............. 429/72; 429/185; 429/178; 429/211; 429/181

(58) Field of Classification Search ............ None
See application file for complete search history.

(56) References Cited

U.S. PATENT DOCUMENTS 6,045,944 A * 4/2000 Okada et al. ............. 429/163
6,447,949 B2 * 9/2002 Iwata et al. ............. 429/185

FOREIGN PATENT DOCUMENTS

| JP | 11-149915 | 6/1999 |
|---|---|---|
| JP | 2001313022 A | * 11/2001 |
| KR | 2003-0060484 | 7/2003 |

OTHER PUBLICATIONS

Office Action issued in Chinese Patent Application No. 03125517.5 on Apr. 14, 2006.

* cited by examiner

*Primary Examiner*—Dah-Wei Yuan
*Assistant Examiner*—Karie O'Neill
(74) *Attorney, Agent, or Firm*—Stein, McEwen & Bui, LLP

(57) ABSTRACT

A secondary battery including a cap assembly with a structure improved for tight sealing and a plug therefor are provided. The secondary battery includes a battery unit formed by rolling a stack of a negative plate, a separator, and a positive plate, a cap assembly, and an electrode tab drawn out from one of the negative plate and the positive plate and electrically connected to an electrode port from the cap assembly. The cap assembly includes: a cap plate having a port aperture and an electrolyte injection hole; the electrode port connected via the port aperture to the electrode tab; a gasket installed to surround the electrode port so as to insulate the electrode port from the cap plate; and a plug which is plugged into the electrolyte injection hole by pressing and whose upper rim matches an upper edge of the electrolyte injection hole. The plug has a fixed position with respect to the electrolyte injection hole, so that the battery may be more hermetically sealed, without causing failure in welding, and becomes more reliable.

19 Claims, 5 Drawing Sheets

SECONDARY BATTERY INCLUDING IMPROVED CAP ASSEMBLY AND PLUG FOR THE SECONDARY BATTERY

CROSS-REFERENCE TO RELATED APPLICATIONS

This application claims the benefit of Korean Patent Application No. 2002-54942, filed on Sep. 11, 2002, in the Korean Intellectual Property Office, the disclosure of which is incorporated herein in its entirety by reference.

BACKGROUND OF THE INVENTION

1. Field of the Invention

The present invention relates to a secondary battery, and more particularly, to a secondary battery including a cap assembly having an improved structure for plugging up an electrolyte injection hole, and a plug for the electrolyte injection hole.

2. Description of the Related Art

Secondary batteries, which are distinguished from primary batteries due to their ability to be repeatedly charged and discharged, have been widely used in cellular phones, notebook computers, camcorders, and other portable electronic devices. Lithium secondary batteries having an operating voltage of 3.6 V or greater, which is three times higher than nickel-cadmium (Ni—Cd) batteries, popularized as a power source for various kinds of electronic equipment and nickel-hydrogen batteries, are frequently used because of their high energy density per unit of weight.

Such lithium secondary batteries generally use lithium oxide as a negative active material and a carbonaceous material as a positive active material. Lithium secondary batteries may be classified into liquid electrolyte batteries, also known as lithium ion batteries, and polymer electrolyte batteries, also known as lithium polymer batteries, according to the type of electrolyte used. Lithium secondary batteries are manufactured in various shapes, typically, in cylindrical, rectangular, or pouch forms.

FIG. 1 shows a conventional rectangular secondary battery. Referring to FIG. 1, a conventional secondary battery 10 includes a can 11, a battery unit 12 accommodated in the can 11, and a cap assembly 20 coupled to the can 11.

The battery unit 12 includes a negative plate 13, a separator 14, and a positive plate 15, which are sequentially stacked upon one another and rolled to be cylindrical. A negative tab 16 and a positive tab 17 connected with the respective negative plate 13 and the positive plate 15 are drawn out from the battery unit 12.

The cap assembly 20 includes a cap plate 21, which covers the top of the can 11, a positive port 23 insulated from the cap plate 21 via a gasket 22, an insulating plate 24 disposed underneath the cap plate 21, and a port plate 25 disposed underneath the insulating plate 24 and electrically connected to the positive port 23.

The negative tab 16 is electrically connected to the cap plate 21, and the positive tab 17 is electrically connected to the positive port 23 via the port plate 25.

The cap plate 21 includes an electrolyte injection hole 26 through which an electrolyte is injected into the can 11 and which is plugged up with a plug 27.

FIG. 2A illustrates a state before the electrolyte injection hole 26 of FIG. 1 is plugged up, and FIG. 2A illustrates a state after the electrolyte injection hole 26 is plugged up.

Referring to FIGS. 2A and 2B, the electrolyte injection hole 26 with a rounded upper edge 28 is formed in the cap plate 21. After an electrolyte is injected into the can 11 of FIG. 1, the plug 27, such as a ball, is placed on the rounded upper edge 28 of the electrolyte injection hole 26.

The ball 27 is compressed downward into the electrolyte injection hole 26 by a compression unit, such as a press 1, and laser welding is performed on the boundary of the compressed ball 27, thus forming a welded portion 29 and sealing the electrolyte injection hole 26.

However, such a structure of sealing the electrolyte injection hole 26 in the conventional secondary battery has the following problems. When the ball 17 that is seated on the rounded upper edge 28 of the electrolyte injection hole 26 formed in the cap plate 21 is pressed downward, it is highly unlikely that it takes on the shape of a truly circular flat head with a consistent flange along the rim of the electrolyte injection hole 16.

As a result, the electrolyte injected into the battery 10 externally leaks through a gap near the rim of the electrolyte injection hole 26, as indicated by arrows in FIG. 2B. The leaked electrolyte causes a serious spark during a welding process. Such poor sealing of the electrolyte injection hole 26 degrades the reliability of the battery 10.

A secondary battery to solve these problems is disclosed in Korean Patent Application No. 2002-1205 filed on Jan. 9, 2002. This secondary battery includes a multi-stepped electrolyte injection hole in a cap plate. A pin which fits the multi-stepped wall of the electrolyte injection hole is tightly fitted into the electrolyte injection hole by pressing, and then is subjected to welding.

However, the electrolyte may stay in the multi-stepped portion of the hole and leak externally when the pin is fitted into the electrolyte injection hole. The leaked electrolyte causes failure in welding, so that the electrolyte injection hole cannot be hermetically sealed.

SUMMARY OF THE INVENTION

The present invention provides a tighter plug, for a secondary battery that has an improved structure and a secondary battery that has a cap assembly with an improved sealing structure in which the plug is tightly fitted into an electrolyte injection hole of a cap plate.

In accordance with an aspect of the present invention, a cap assembly comprises a cap plate having a port aperture and an electrolyte injection hole; an electrode port which engages the port aperture; a gasket installed to surround the electrode port to insulate the electrode port from the cap plate; and a plug which is plugged into the electrolyte injection hole by pressing and whose upper rim matches an upper edge of the electrolyte injection hole.

According to specific embodiments of the cap assembly, the electrolyte injection hole may comprise first and second tapering portions with different slopes, and the plug may comprise a body and an extension extending from the body. The body of the plug may contact the first tapering portion tightly and the extension may contact the second tapering portion tightly when the plug is pressed into the electrolyte injection hole.

A top surface of the plug may be aligned with a top surface of the cap plate when the plug is fitted into the electrolyte injection hole. The boundary between the electrolyte injection hole and the plug may be sealed by welding after the plug is fitted into the electrolyte injection hole, so that a welded portion is formed along the boundary.

An outer surface of the plug may be coated with a polymer and fitted into the electrolyte injection hole by pressing.

In accordance with another aspect of the present invention, a secondary battery comprises a battery unit formed by rolling a stack of a negative plate, a separator, and a positive plate; a cap assembly; and an electrode tab, in which the cap assembly includes a cap plate having a port aperture and an electrolyte injection hole, an electrode port which engages the port aperture, a gasket installed to surround the electrode port to insulate the electrode port from the cap plate, and a plug which is plugged into the electrolyte injection hole by pressing, and whose upper rim matches an upper edge of the electrolyte injection hole, and the electrode tab is drawn out from one of the negative plate and the positive plate, and is electrically connected to the electrode port.

In accordance with another aspect of the present invention, a plug is utilized in a secondary battery that includes a battery unit, a can which accommodates the battery unit, and a cap assembly with an electrolyte injection hole. The plug is plugged into the electrolyte injection hole and has a body with an upper rim that matches an upper edge of the electrolyte injection hole and an extension extending from the body, wherein the body of the plug tightly contacts a first tapering portion of the electrolyte injection hole, and the extension of the plug tightly contacts a second tapering portion of the electrolyte injection hole when the plug is fitted into the electrolyte injection hole.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
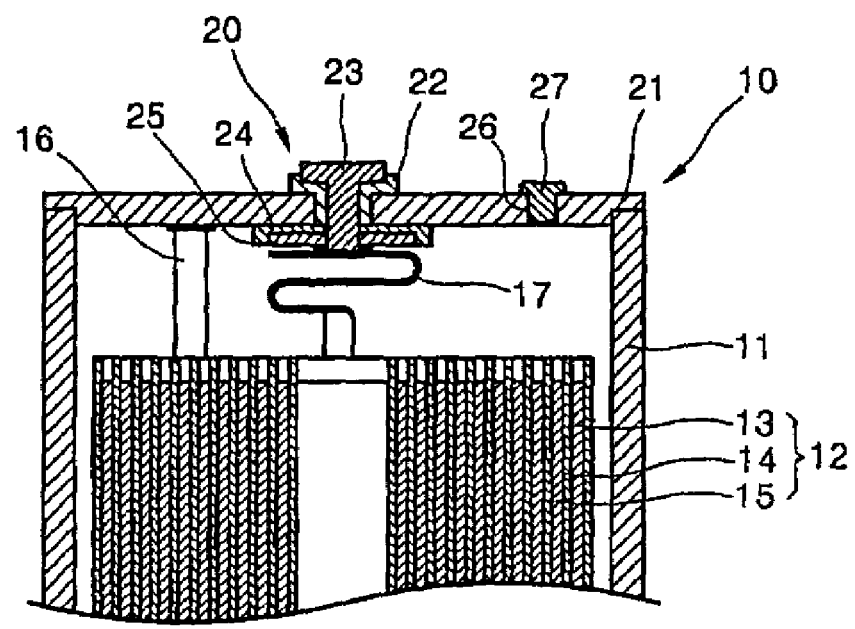
FIG. 1 is a partial sectional view of a conventional secondary battery.
Figure 2A:
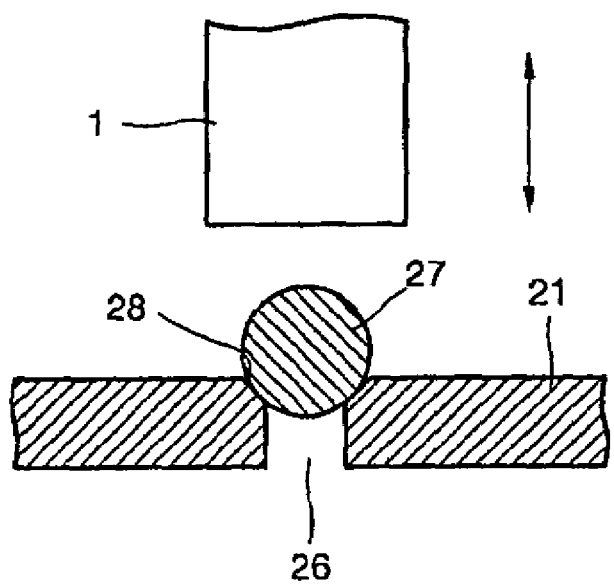
FIG. 2A is an enlarged view illustrating a state before an electrolyte injection hole in FIG. 1 is plugged.
Figure 2B:
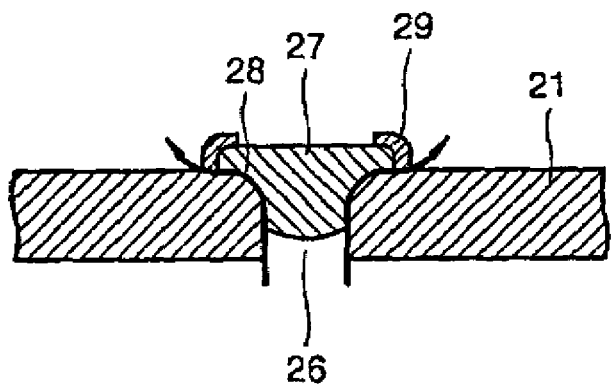
FIG. 2B is an enlarged view illustrating a state after the electrolyte injection hole in FIG. 1 is plugged.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
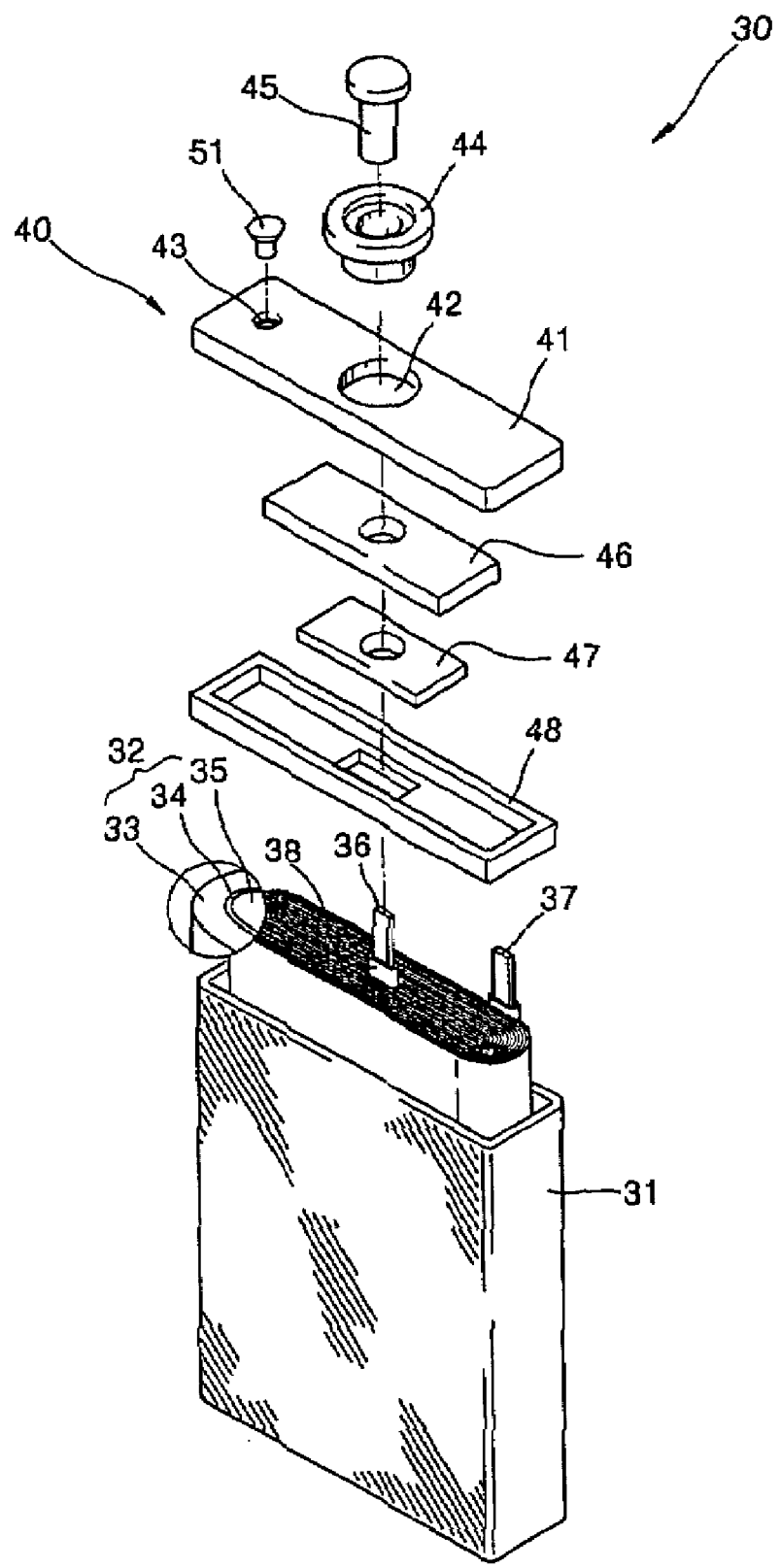
FIG. 3 is an exploded perspective view of a secondary battery according to an embodiment of the present invention.

A secondary battery, according to an embodiment of the present invention, is shown in FIG. 3. Referring to FIG. 3, a secondary battery 30 includes a can 31, a battery unit 32 which is accommodated in the can 31, and a cap assembly 40 which covers an upper edge of the can 31.

The can 31, which is rectangular, is made of metal, so it may act as a port. The battery unit 32, which is accommodated in the can 31, includes a negative plate 33, a separator 34, and a positive plate 35, which are stacked upon one another and rolled together into a jelly-roll form.

For example, in a lithium secondary battery, the negative plate 33 is formed by coating a negative collector made of a thin aluminum film with a lithium oxide-based slurry. The positive plate 35 is formed by coating a positive collector made of a thin copper film with a carbonaceous material-based slurry.

A negative tab 37 and a positive tab 36 connected with the respective negative plate 33 and positive plate 35 are drawn out above the battery unit 32. The negative tab 37 and the positive tab 36 may be fixed to the respective negative collector and positive collector by welding.

The positions of the negative tab 37 and the positive tab 36 may be switched. Portions of the negative tab 37 and the positive tab 36 which are adjacent to the respective negative tab 37 and positive tab 36 may be wound with an insulating tape 38 in order to prevent shorting out.

The cap assembly 40 is fitted into a top opening of the can 31. The cap assembly 31 includes a cap plate 41, an insulating plate 46 disposed underneath the cap plate 41, and a port plate 47 disposed underneath the insulating plate 46.

The cap plate 41 has a port aperture 42 at the center thereof. A positive port 45 is inserted via a gasket 44 into the port aperture 42 toward the can 31. The gasket 44 surrounding the positive port 45 insulates the positive port 45 from the cap plate 41. The positive port 45 reaches up to the port plate 47. An insulating case 48 may be further interposed between the cap assembly 40 and the battery unit 32.

The negative tab 37 is directly fixed to the cap plate 41, for example, by welding. The positive tab 36 is fixed and electrically connected via the port plate 47 to the positive port 45, for example, by welding. A battery according to an alternative embodiment of the present invention may have a structure in which the negative tab 37 is connected to the positive port 45 and the positive tab 36 is connected to the cap plate 41. The structure of the cap assembly 40 is not limited to the above.

As shown in FIG. 3, an electrolyte injection hole 43 through which an electrolyte is injected into the can 31 is formed near an end of the cap plate 41. The electrolyte injection hole 43 is plugged up with a plug 51 after the electrolyte is injected into the can 31.

Figure 5A:
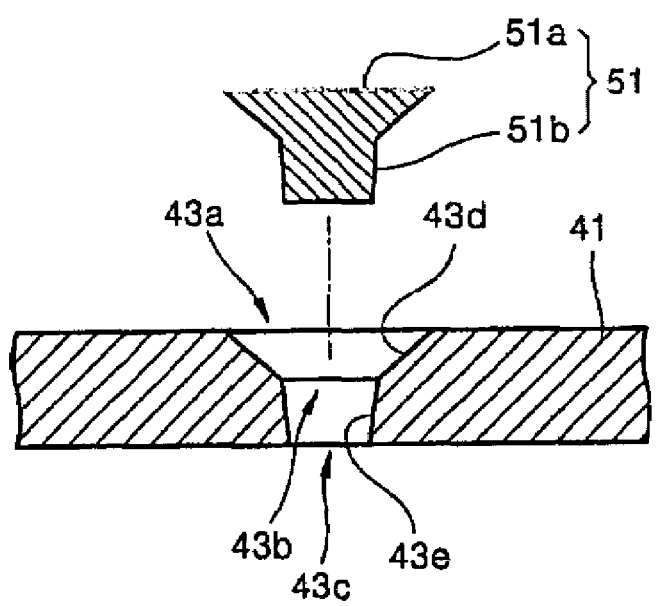
FIG. 5A is an enlarged view illustrating a state before the electrolyte injection hole in FIG. 3 is plugged.

Referring to FIG. 5A, the electrolyte injection hole 43 includes a first hole 43a, which is the uppermost hole formed in the top surface of the cap plate 41, a second hole 43b, which is formed in the middle of the cap plate 41, and a third hole 43c, which is the lowermost hole formed in the bottom surface of the cap plate 41. The first, second, and third holes 43a, 43b, and 43c are coaxial.

The electrolyte injection hole 42 tapers from the first hole 43a toward the third hole 43c via sections with different slopes. The electrolyte injection hole 42 includes a first tapering portion 43d between the first and second holes 43a and 43b and a second tapering portion 43e between the second and third holes 43b and 43c.

The first tapering portion 43d is more tapered than the second tapering portion 43e. Accordingly, the electrolyte injection hole 43 has a wider entry than exit.

The plug 51 plugged into the electrolyte injection hole 43 having the structure as described above includes a body 51a and an extension 51b extending from the body 51a. The body 51a fits the first tapering portion 43d of the electrolyte hole 43. When the plug 51 is fully inserted into the electrolyte injection hole 43, a top surface of the body 51 is aligned with the top surface of the cap plate 41. The rim of the body 51a substantially matches the upper edge of the electrolyte injection hole 43.

The body 51a has a thickness that is substantially equal to the distance from the entry of the electrolyte injection hole 43 to the boundary between the first and second tapering portions 43a and 43e.

The body 51a has a size that fits the first tapering portion 43d of the electrolyte injection hole 43. Alternatively, the size of the body 51a may be slightly larger than the first tapering portion 43d so that the body 51a may be fitted by pressing.

The extension 51b extending downward from the body 51a is smaller in diameter than the body 51a and fits the second tapering portion 43e of the electrolyte injection hole 43. The size of the extension 51b may be determined as a size that fits into the second tapering portion 43e by pressing.

The outer surface of the plug 51 may be coated with a polymer. When the plug 51 coated with a polymer is fitted into the electrolyte injection hole 41 by pressing, an additional process, such as welding, for tightly fixing the plug 51 to the electrolyte injection hole 41 is unnecessary.

Figure 4:
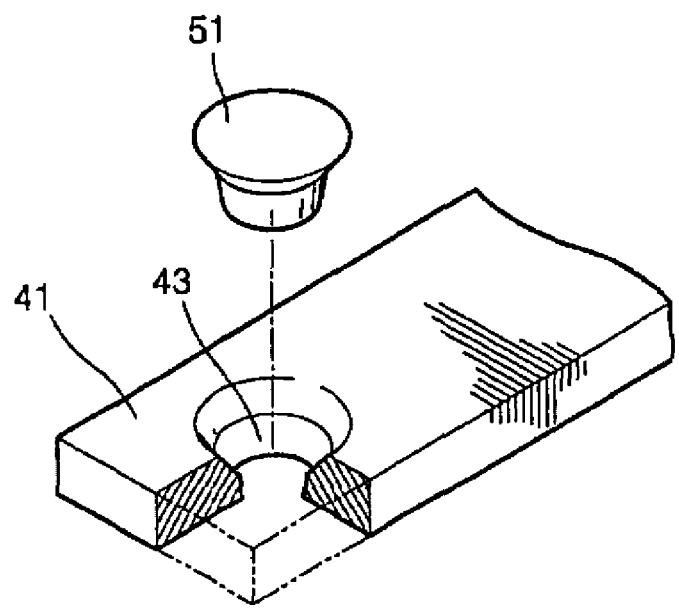
FIG. 4 is an enlarged perspective view illustrating an electrolyte injection hole in FIG. 3.

A process of plugging up the electrolyte injection hole 43 having the above structure will now be described with reference to FIGS. 5A and 5B. FIG. 5A illustrates a state before the electrolyte injection hole 43 in FIG. 4 is plugged, and FIG. 5B illustrates a state after the electrolyte injection hole 43 is plugged.

Figure 5B:
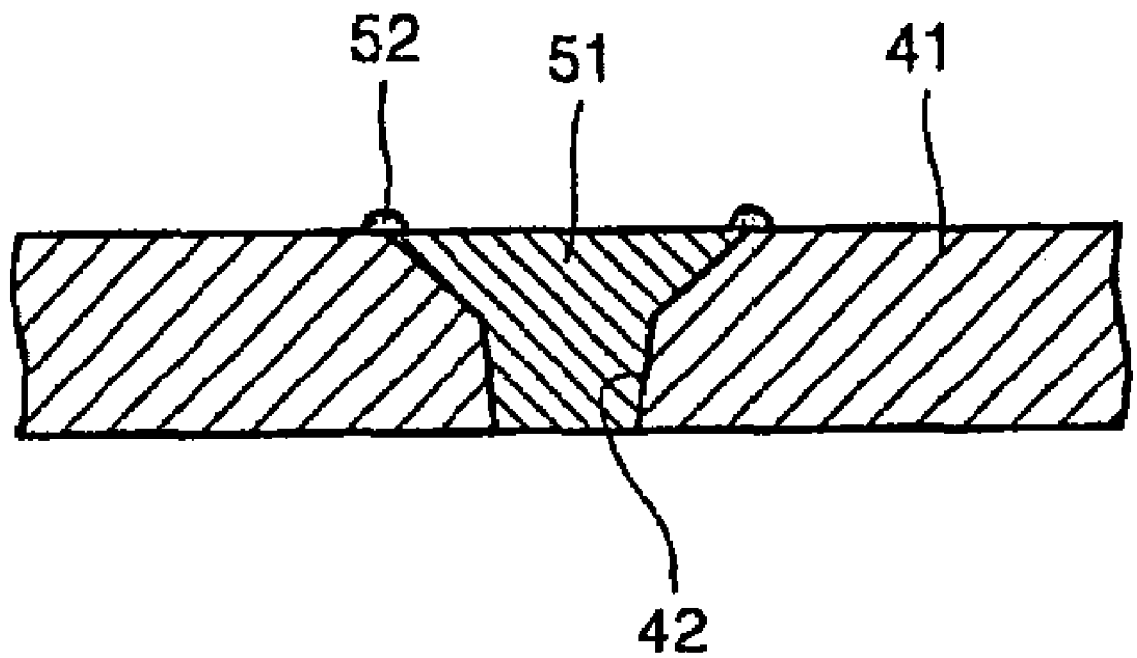
FIG. 5B is an enlarged view illustrating a state after the electrolyte injection hole in FIG. 3 is plugged.

As shown in FIGS. 5A and 5B, the first hole 43a is formed in the top surface of the cap plate 41, the second hole 43b is formed in the middle of the cap plate 41, and the third hole 43c is formed in the bottom surface of the cap plate 41. The diameter of the second hole 43b is smaller than the diameter of the first hole 43a, and the region therebetween is the first tapering portion 43d. The diameter of the third hole 43c is smaller than the diameter of the second hole 43b and the region therebetween is the second tapering portion 43e.

When the plug 51 is fitted into the electrolyte injection hole 43 by pressing so that the top surface of the plug 51 is aligned with the top surface of the cap plate 41, the body 51a of the plug 51 fully contacts the inner wall of the first tapering portion 43d, and the extension 51b of the plug 51 fully contacts the inner wall of the second tapering portion 43e, so that the plug 51 and the electrolyte injection hole 43 are tightly connected. The rim of the body 51a of the plug 51 matches the edge of the first hole 43a.

After the plug 51 is inserted into the electrolyte injection hole 43, the boundary between the body 51a of the plug 51 and the first injection hole 43a may be hermetically sealed, for example, by laser welding, so that a welded portion 52 is formed. As a result, the electrolyte injection hole 43 is hermetically plugged with the plug 51.

Due to the structure of the electrolyte injection hole 43, an electrolyte that remains near the electrolyte injection hole 43 after being injected into the battery naturally flows down along the first and second tapering portions 43d and 43e. Accordingly, leakage of the electrolyte from the battery 30 and failure in welding may be prevented. In addition, the plug 51 is easily and tightly plugged into the electrolyte injection hole 43 without an extra pressing device.

As described above, according to the present invention, an electrolyte injection hole formed in a cap assembly has a multi-stepped inner wall, i.e., first and second tapering portions, and is plugged with a plug which fits the first and second tapering portions by applying pressure. Accordingly, an electrolyte remaining near the electrolyte injection hole after being injected into a battery naturally flows down into the battery and does not leak. In addition, the plug has a fixed position with respect to the electrolyte injection hole. Therefore, the battery may be more hermetically sealed without causing a failure in welding, and becomes more reliable.

The plug is easily coupled to the electrolyte injection hole by simple pressing, so that the overall process of packing a battery is simplified.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A cap assembly, comprising:
   a cap plate having a port aperture and an electrolyte injection hole, wherein the electrolyte injection hole comprises first and second tapering portions with different slopes,
   wherein the first tapering portion extends inwardly from a surface of the cap plate and is more tapered than the second tapering portion;
   an electrode port which engages the port aperture;
   a gasket installed to surround the electrode port to insulate the electrode port from the cap plate; and
   a plug comprising a body and an extension extending from the body and which is plugged into the electrolyte injection hole by pressing, wherein the body has an upper rim that matches an upper edge at the first tapering portion of the electrolyte injection hole, and
   wherein the body of the plug contacts the first tapering portion tightly and the extension contacts the second tapering portion tightly when the plug is pressed into the electrolyte injection hole.

2. The cap assembly of claim 1, wherein a top surface of the plug is aligned with a top surface of the cap plate when the plug is fitted into the electrolyte injection hole.

3. The cap assembly of claim 1, wherein a boundary between the electrolyte injection hole and the plug is sealed by welding after the plug is fitted into the electrolyte injection hole, so that a welded portion is formed along the boundary.

4. The cap assembly of claim 1, wherein an outer surface of the plug is coated with a polymer, and the plug is fitted into the electrolyte injection hole by pressing.

5. A secondary battery, comprising:
   a battery unit formed by rolling a stack of a negative plate, a separator, and a positive plate;
   a cap assembly comprising: a cap plate having a port aperture and an electrolyte injection hole, wherein the electrolyte injection hole comprises first and second tapering portions with different slopes, wherein the first tapering portion extends inwardly from a surface of the cap plate and is more tapered than the second tapering portion;
   an electrode port which engages the port aperture;
   a gasket installed to surround the electrode port to insulate the electrode port from the cap plate;
   a plug comprising a body and an extension extending from the body and which is plugged into the electrolyte injection hole by pressing, wherein the body has an upper rim that matches an upper edge at the first tapering portion of the electrolyte injection hole, and wherein the body of the plug contacts the first tapering portion tightly and the extension contacts the second tapering portion tightly when the plug is pressed into the electrolyte injection hole; and an electrode tab drawn out from one of the negative plate and the positive plate and electrically connected to the electrode port.

6. The secondary battery of claim 5, wherein a top surface of the plug is aligned with a top surface of the cap plate when the plug is fitted into the electrolyte injection hole.

7. The secondary battery of claim 5, wherein a boundary between the electrolyte injection hole and the plug is sealed by welding after the plug is fitted into the electrolyte injection hole, so that a welded portion is formed along the boundary.

8. The secondary battery of claim 1, wherein an outer surface of the plug is coated with a polymer and the plug is fitted into the electrolyte injection hole by pressing.

9. A plug for a secondary battery that includes a battery unit, a can which accommodates the battery unit, and a cap assembly with an electrolyte injection hole comprising first and second tapering portions with different slopes, wherein the first tapering portion extends inwardly from a surface of the cap plate and is more tapered than the second tapering portion, the plug pluggable into the electrolyte injection hole, the plug comprising:

a body having an upper rim that matches an upper edge at the first tapering portion of the electrolyte injection hole; and an extension extending from the body, wherein the body of the plug contacts a first tapering portion of the electrolyte injection hole tightly and the extension of the plug contacts a second tapering portion of the electrolyte injection hole tightly when the plug is fitted into the electrolyte injection hole.

10. The plug of claim 9, wherein a top surface of the plug is aligned with a top surface of a cap plate when the plug is fitted into the electrolyte injection hole, wherein the cap plate substantially matches an upper edge of the can.

11. The plug of claim 9, further comprising a welded portion formed on a boundary between the electrolyte injection hole and the plug.

12. The plug of claim 9, wherein an outer surface of the plug is coated with a polymer and the plug is fitted into the electrolyte injection hole by pressing.

13. The plug of claim 9, wherein the electrolyte injection hole tapers from a first hole toward a third hole via sections having different slopes, wherein the electrolyte injection hole includes a first tapering portion between the first hole and a second hole and a second tapering portion between the second hole and the third holes.

14. The plug of claim 13, wherein the first tapering portion is more tapered than the second tapering portion to create a wider entry than exit.

15. The plug of claim 13, wherein the plug comprises:

a body; and an extension extending from the body, wherein the body fits the first tapering portion of the electrolyte hole and wherein, when the plug is fully inserted into the electrolyte injection hole, a top surface of the body is aligned with a top surface of a cap plate and a rim of the body substantially matches an upper edge of the electrolyte injection hole.

16. The plug of claim 15, wherein the body has a thickness that is substantially equal to a distance from an entry of the electrolyte injection hole to a boundary between the first and second tapering portions.

17. The plug of claim 15, wherein a size of the body is one of:

a size that fits the first tapering portion of the electrolyte injection hole; and a size slightly larger than the first tapering portion so that the body is fitted by pressing.

18. The plug of claim 15, wherein the extension extending downward from the body is smaller in diameter than the body and fits into the second tapering portion of the electrolyte injection hole by pressing.

19. The plug of claim 15, wherein the plug is welded to a rim of the electrolyte injection hole.

* * * * *